Oct. 26, 1954 — W. A. ROBERTSON — 2,692,462
PRECISION GRINDING FIXTURE
Filed Oct. 19, 1953

WILLIAM A. ROBERTSON
INVENTOR.

BY Hubert Miller
ATTORNEY.

Patented Oct. 26, 1954

2,692,462

UNITED STATES PATENT OFFICE 2,692,462

PRECISION GRINDING FIXTURE

William A. Robertson, Wichita, Kans.

Application October 19, 1953, Serial No. 386,709

3 Claims. (Cl. 51—217)

This invention relates to a tool or fixture which serves as an aid in the accurate drilling, grinding or milling of parts of various sizes and shapes. It also relates to a method of grinding or milling a work piece.

With modern machine shop methods and fixtures it is an extremely difficult and time consuming operation to shape a work piece into a perfect parallelepiped, to provide a work piece with absolutely parallel opposite edges, or to drill a hole into a work piece edge with the axis of the hole absolutely parallel to a flat surface of the work piece.

It is the prime object of this invention to provide a fixture which will enable a machine tool operator to perform all of the above mentioned operations easily and quickly, without the necessity of making trial cuts, using gages and levels, etc.

It is an additional object to provide a fixture of the type mentioned which will also serve as an inspection tool for parts machined on other machine tools.

Another object is to provide a method of grinding or milling a work piece to provide it with parallel edges, or to shape it into a parallelepiped.

The invention, together with other objects, will be more clearly understood when the following description is read with reference to the accompanying drawings, in which.

Figure 2:
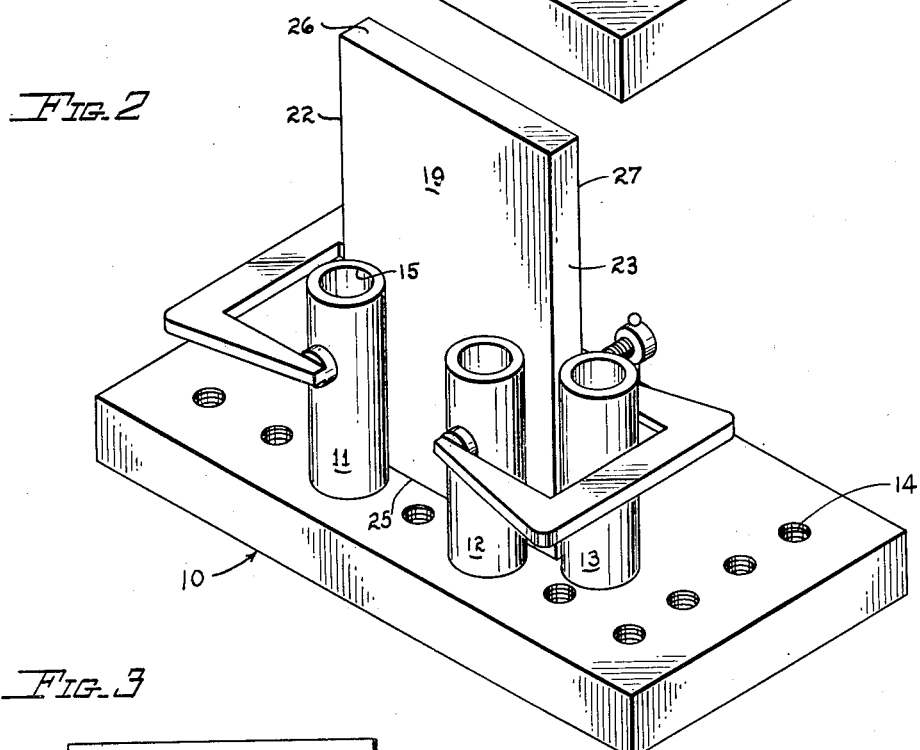
Fig. 2 is a similar view with the work piece rotated 90° in a vertical plane, further illustrating the method of this invention and use of the fixture.
Figure 3:
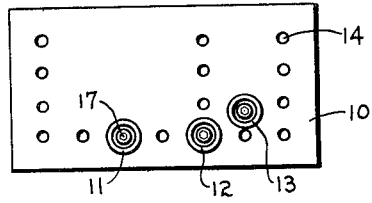
Fig. 3 is a top plan view of the fixture, on a reduced scale.

Referring to Fig. 2 of the drawings, the fixture includes a base plate 10, and a plurality of cylindrical locating members 11, 12, and 13 removably secured to the upper surface of the plate. Plate 10 is a precision ground surface plate, i. e., its two larger surfaces are parallel within extremely close tolerance. Its upper surface is provided with a plurality of spaced threaded holes 14 which are drilled perpendicular to the plate surface, and which may or may not extend through the plate. The hole pattern and spacing may be varied, as desired, but preferably includes a series along at least one long edge, and a series along at least one adjacent short edge. This plate is preferably, but not necessarily made of normalized cast iron.

The metal locating members are accurately ground on centers, are preferably of the same outside diameter, and their ends are accurately ground to be planar and perpendicular to their respective cylindrical surfaces, within one ten thousandth of an inch. Each locating member has a relatively large diameter bore 15 extending from one end to a point near the opposite end, and a connecting reduced diameter central counter bore 16 (Fig. 1) through said opposite end for receiving an Allen-head stud 17, as shown by the cutaway section in Fig. 1. The studs 17 serve to rigidly hold the planar lower end of each locating member flat against the upper surface of plate 10, and to thus hold the locating member so that its cylindrical surface is absolutely perpendicular to the upper surface of the base plate.

Use of the fixture

The plate 10 is placed flat on the table or bed of any grinding or milling machine, and is anchored by the conventional clamps with which such machine tools are conventionally provided. To make sure that the upper surface of the plate 10 is parallel to the grinder travel, a clean-up cut may first be made across the plate surface.

Two of the locating members are then secured, as above described, to the upper surface of the plate in lengthwise spaced relation, the spacing depending somewhat on the size of the work piece to be ground.

Figure 1:
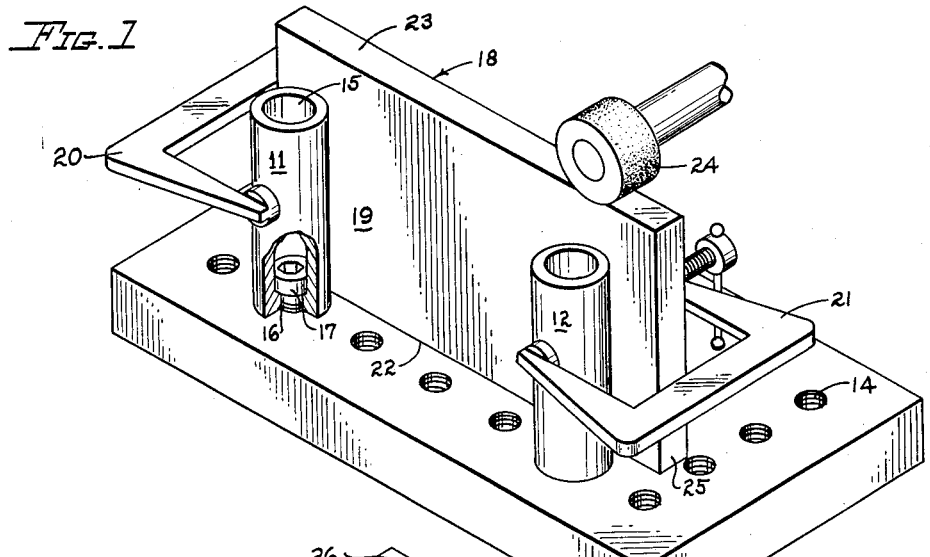
Fig. 1 is a perspective view of a fixture embodying the invention, with a workpiece held in position for grinding one edge surface, one part of the fixture being shown in partial section for clarity.

The work piece 18 is then placed with a flat surface 19 against the cylindrical surfaces of the locating members 11 and 12, as in Fig. 1. Clamps 20 and 21 are then used to clamp the work piece rigidly in the mentioned position, with the lower edge 22 of the work piece preferably spaced slightly above the top surface of plate 10. A grinding or milling cut is then made lengthwise along the edge surface 23 of the work piece, and the resulting surface is perpendicular to surface 19.

If it is desired to produce a second edge on the work piece parallel to the edge 23, the work piece is rotated 180° in a vertical plane and freshly ground edge 23 is seated flat on the surface of the base. The clamps are re-applied and the grinder 24 is moved to make a cut along the edge 22, thus making this edge parallel to the edge 23, and perpendicular to surface 19.

If it is desired to produce a parallelepiped from the work piece the two larger surfaces are first ground or milled in the conventional manner so that both surfaces are parallel.

An edge cut is then made following the procedure just described in connection with Fig. 1. A third locating member 13 is then secured to base plate 10 in a position offset laterally from the plane in which the locating members 11 and 12 are located, as shown in Fig. 2.

Workpiece 18 is then rotated 90° so that its ground edge 23 abuts the cylindrical surface of member 13, and the surface 19 is in firm contact with the cylindrical surfaces of the members 11 and 12. The end 25 is preferably spaced slightly above the top surface of plate 10. A grinder cut is then made along end 26 of the workpiece. Since the work piece is at the time held absolutely perpendicular to the base plate surface, and since the grinder travels parallel to that surface, the end 26 will be absolutely perpendicular to the edge 23 and to the two larger surfaces of the workpiece.

The workpiece may then be unclamped, rotated 90° so that its end 26 abuts member 13, its freshly ground edge 23 rests on the surface of base plate 10, and its surface 19 against members 11 and 12. It is reclamped and edge 22 is ground, making this edge parallel to edge 23, and perpendicular to end 26 and to the two larger surfaces.

A similar 90° rotation of the workpiece and a grinding cut along end 25 produces a finished block having parallel ends 25 and 26, parallel edges 22 and 23, parallel flat surfaces 19 and 27, and in which the respective ends and edges are perpendicular to each other and to the surfaces 19 and 27—a parallelepiped.

If it is desired to drill holes in any end or edge of the work piece parallel to its flat surfaces 19 and 27, for instance, the drill table is first checked to see that it lies in a plane perpendicular to the longitudinal travel of the drill bit. The workpiece is then clamped in the position shown in Fig. 1. Any hole drilled will then be parallel to the four upright surfaces of the workpiece and perpendicular to its horizontal surfaces.

The method of this invention, therefore, is a method of producing a parallelepiped on a grinding or milling machine which includes the steps of grinding two opposite surfaces of a workpiece to make them parallel; positioning the workpiece with the two parallel surfaces perpendicular to the grinder travel and making an edge cut; rotating the workpiece 90° in a plane parallel to its two said parallel surfaces and making a second edge cut perpendicular to the first edge cut; rotating the workpiece an additional 90° in a plane parallel to its two said parallel surfaces and making a third edge cut perpendicular to the second edge cut and parallel to the first edge cut; and rotating the work piece an additional 90° in a plane parallel to its two said parallel surfaces and making a fourth edge cut perpendicular to the first and third edge cuts and parallel to the second edge cut.

From the above explanation, it will be seen that my invention provides a method as well as an aiding fixture for performing extremely accurate grinding jobs—much more accurate than can be accomplished with a conventional angle plate—and without the time consuming use of gages, levels, etc.

Having described the invention with sufficient clarity to enable those familiar with this art to practice the method, and to construct and use the fixture, I claim:

1. A workpiece positioning fixture for a grinding or milling machine comprising: a base plate having its two opposite larger surfaces ground parallel; a plurality of cylindrical locating members each having at least one end ground planar and perpendicular to the cylindrical surface of the square; and means securing said locating members to said base plate in spaced relation to each other with their respective cylindrical surfaces perpendicular to one of the parallel surfaces of the base plate.

2. The fixture described in claim 1 in which the locating members are each provided with a large diameter bore extending from one end to a point near the opposite end, and with a smaller diameter counter bore through said opposite end, and the plate is provided with a series of spaced threaded holes, and the means securing the locating members to the plate are studs inserted through the smaller diameter bore and into selected ones of the threaded holes.

3. A work piece positioning fixture for a grinding or milling machine comprising: a planar surfaced base plate having its two larger surfaces parallel, and having a first series of spaced threaded holes extending along one edge and having a second series of spaced threaded holes extending laterally with relation to the first series, the longitudinal axes of all said holes being substantially perpendicular to the parallel surfaces of the plate; at least two cylindrical locating members having planar ends perpendicular to their longitudinal axes positioned with their planar ends flat against one parallel surface of the plate and covering respective ones of said threaded holes; and a threaded stud extending lengthwise through at least a portion of each of said locating members and into the respective covered holes, and securing the members to the base plate with their respective cylindrical surfaces perpendicular to the adjacent parallel surface of the plate.

References Cited in the file of this patent

UNITED STATES PATENTS

| Number | Name | Date |
|---|---|---|
| 1,685,899 | Andrew | Oct. 2, 1928 |